United States Patent
Chen et al.

(10) Patent No.: US 10,027,481 B2
(45) Date of Patent: Jul. 17, 2018

(54) MANAGEMENT OF CRYPTOGRAPHIC KEYS

(71) Applicant: Hewlett Packard Enterprise Development LP, Houston, TX (US)

(72) Inventors: Liqun Chen, Bristol (GB); Fraser John Dickin, Bristol (GB); Martin Sadler, Bristol (GB); Chris I Dalton, Bristol (GB); Nigel Edwards, Bristol (GB); Simon Kai-Ying Shiu, Bristol (GB); Boris Balacheff, Les Ulis (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 46 days.

(21) Appl. No.: 14/755,125

(22) Filed: Jun. 30, 2015

(65) Prior Publication Data

US 2016/0127128 A1 May 5, 2016

(30) Foreign Application Priority Data

Oct. 31, 2014 (FR) ..................... 14 60537

(51) Int. Cl.
*H04L 9/08* (2006.01)
*G06F 21/72* (2013.01)
(Continued)

(52) U.S. Cl.
CPC .......... *H04L 9/0897* (2013.01); *G06F 21/72* (2013.01); *H04L 9/0866* (2013.01); *H04L 9/3073* (2013.01); *H04L 9/3247* (2013.01)

(58) Field of Classification Search
CPC ... H04L 9/0861; H04L 9/3247; H04L 9/0897; G06F 21/72
See application file for complete search history.

(56) References Cited

U.S. PATENT DOCUMENTS 6,918,036 B1 * 7/2005 Drews ............... G06F 21/64
713/156
8,229,114 B2 7/2012 Nan et al.
(Continued)

FOREIGN PATENT DOCUMENTS

| EP | 2285040 A1 | 4/2014 |
| WO | WO-9949612 A1 | 9/1999 |
| WO | WO-2014057369 A1 | 7/2012 |

OTHER PUBLICATIONS

Mone, S.P., et al., Enforcing Multi-user Security Policies in Cloud Computing, International Journal of Electrical and Computer Engineering, vol. 3, No. 4 Aug. 2013, pp. 504-508.
(Continued)

*Primary Examiner* — Mohammad A Siddiqi
(74) *Attorney, Agent, or Firm* — Cabinet Beau de Lomenie (57) ABSTRACT

An electronic device for management of cryptographic keys, and a corresponding method implemented in a computing device comprising a physical processor, transmit feature data of the device to a key generation module, wherein the feature data comprises information corresponding to an identifier or an attribute of the device, and receive, by the device from the key generation module, a digital signature of the transmitted feature data. The device installs the received digital signature as a cryptographic private key for communication, and performs a cryptographic operation using the installed digital signature as the cryptographic private key.

20 Claims, 3 Drawing Sheets

(51) Int. Cl.
*H04L 9/32* (2006.01)
*H04L 9/30* (2006.01)

(56) References Cited

U.S. PATENT DOCUMENTS

| | | | |
|---|---|---|---|
| 8,522,014 | B2 | 8/2013 | Fedronic et al. |
| 8,571,993 | B2 | 10/2013 | Kocher et al. |
| 8,756,417 | B1* | 6/2014 | Gardner ................ G06F 21/57 |
| | | | 380/262 |
| 9,621,525 | B2* | 4/2017 | Brumley ............... H04L 63/061 |
| 2004/0139029 | A1 | 7/2004 | Zhang et al. |
| 2006/0215837 | A1 | 9/2006 | Chen et al. |
| 2007/0101138 | A1* | 5/2007 | Camenisch ........... H04L 9/3234 |
| | | | 713/168 |
| 2007/0136599 | A1* | 6/2007 | Suga .................... H04L 9/3247 |
| | | | 713/176 |
| 2007/0168676 | A1* | 7/2007 | Fayad .................... G06F 21/72 |
| | | | 713/185 |
| 2007/0226505 | A1* | 9/2007 | Brickell ................ G06F 21/57 |
| | | | 713/176 |
| 2009/0165099 | A1* | 6/2009 | Eldar .................. H04L 41/0869 |
| | | | 726/5 |
| 2010/0146281 | A1* | 6/2010 | Grieder ................ H04L 63/104 |
| | | | 713/175 |
| 2011/0211699 | A1* | 9/2011 | Ma ........................ H04L 9/0819 |
| | | | 380/278 |
| 2012/0258777 | A1 | 10/2012 | Huang |
| 2014/0351596 | A1* | 11/2014 | Chan ....................... H04L 63/08 |
| | | | 713/170 |
| 2015/0199520 | A1* | 7/2015 | Woolley ................ G06F 21/575 |
| | | | 713/2 |
| 2015/0213433 | A1* | 7/2015 | Khan .................... G06Q 20/3227 |
| | | | 705/71 |
| 2015/0256345 | A1* | 9/2015 | Vaid ...................... H04L 9/3268 |
| | | | 713/158 |
| 2016/0094348 | A1* | 3/2016 | Takahashi ............. H04L 9/0866 |
| | | | 713/175 |

OTHER PUBLICATIONS

United Kingdom Combined Search & Exam Report, United Kingdom Patent Application No. 1510175.1, dated Dec. 9, 2015, 7 pages.

* cited by examiner

MANAGEMENT OF CRYPTOGRAPHIC KEYS

BACKGROUND

The present disclosure relates to methods, electronic devices and systems involved in management of cryptographic keys.

Nowadays cryptographic techniques are ubiquitous in fields of activity such as data processing and telecommunications. Cryptographic techniques are used for various purposes including, for instance: authentication, ensuring the confidentiality and integrity of data, and so on.

Cryptographic techniques involve the use of cryptographic keys and so it becomes necessary to provide various key management functions, for example: key protection, and functions involved in maintenance of a key life cycle (e.g. key generation, key registration, key distribution, key revocation, and so on).

Different key management mechanisms have been proposed including, for example, those specified in the ISO/IEC 11770 standard (Information technology—Security techniques—Key management).

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As such, in the present document the following definitions may apply:

Entity: An entity may comprise a person, a hardware component or device, a process, an organization, or a group of such items that has a recognizably distinct existence and may be designated by an identifier.

Domain: A domain may comprise a set of entities operating under a single security policy. For example, a number of components which securely communicate with each other using the aid of a single key authority, or a set of authorities using the same security policy for data integrity, may constitute a domain. In general, a key management service is run by entities in a specific domain. In cases where a service is used across multiple domains, extra care should be taken among the different domains.

Identifier: An identifier may comprise one or more attributes that uniquely characterize an entity in a specific domain. Examples of identifiers include a distinguishing number or an IP address of a component, a URL, an email address, a username, an account number, and so on.

Key: A key may comprise a sequence of symbols that controls the operation of a cryptographic transformation. Examples of cryptographic transformations include encryption, decryption, message authentication code (MAC) computation, signature calculation, signature verification, key establishment, and so on.

Key user: A key user may comprise an entity that uses a key to operate a cryptographic transformation. A key user may or may not be a key owner.

Key owner: A key owner may comprise an entity that uses either a symmetric key or a secret key of an asymmetric key pair to operate a cryptographic transformation. A key owner is also a key user.

Key authority: A key authority may comprise an entity that provides a single key management service or a set of services. A key authority may also have the role a key user or a key owner.

Encryption: Encryption may comprise a (reversible) transformation of data by a cryptographic algorithm to produce ciphertext, i.e., to hide the information content of the data.

Decryption: Decryption may comprise transformation of ciphertext by a cryptographic algorithm to recover corresponding pre-encryption information content.

Digital signature: A digital signature may comprise data appended to, or a cryptographic transformation of, a data unit that allows a recipient of the data unit to prove the source of integrity of the data unit and protect against forgery.

Signature verification: Signature verification may comprise a process which may take as input a signed message, a verification key and the domain parameters, and which gives as output the result of the signature verification: valid or invalid.

The present disclosure describes examples of key management techniques that may be applied with advantage in the context of environments where entities that may have different security requirements and capabilities interact. For example, these key management techniques may be used in environments in which entities interact over a connection fabric which may interconnect them over untrusted connections, and where different trust relationships may apply between the entities. In environments of this type, it may be desirable to employ cryptographic techniques in order to ensure security, which may implicate the use of cryptographic keys and key management techniques. However, known key management techniques fail to meet the challenges inherent in environments of this type.

Example methods, devices and systems according to the present disclosure provide key management techniques that are able to cope with interaction between entities having arbitrary security policies and/or that may deal efficiently with large numbers of entities.

Figure 1:
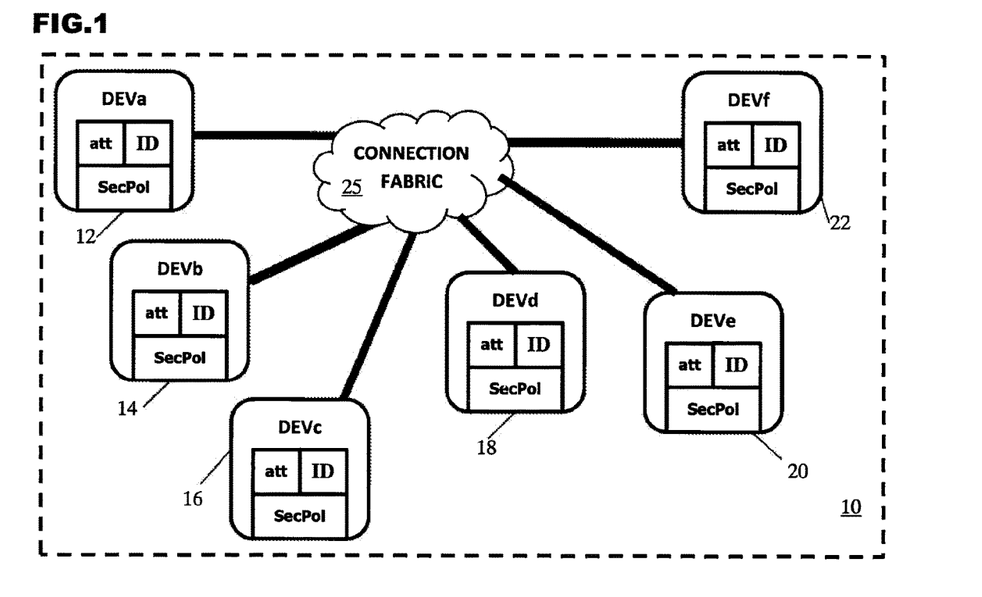
FIG. 1 is a diagram representing an example of a system according to the present disclosure comprising devices that interact by communicating digital data to one another.

FIG. 1 illustrates an example of an environment in which key management techniques according to an example of the present disclosure may be applied. In the example of FIG. 1, the environment is a system comprising computation devices and memory devices interconnected to form a computing platform. In this computing platform, the interacting entities may be electronic devices of various types including, but not limited to: components, central processing unit cores (CPU cores), system-on-a-chip (SoCs), memory devices, accelerators, co-processors, and so on.

Although only a few electronic devices are illustrated in FIG. 1, this example targets computing platforms that may be implemented at various different scales going from a small system comprising of the order of 10 interacting devices to an extremely large system where the number of interacting devices may exceed 10 000.

In the example illustrated in FIG. 1, the various electronic devices are interconnected by a connection fabric which may include direct connections between entities connections via switches, connection buses, and so on. The connection fabric may include wired and/or wireless links. This example relates to an open, distributed system in which electronic devices can interact with one another in an ad hoc manner.

The computing platform of FIG. 1 includes electronic devices DEVa to DEVf which each have their own identifiers (labelled ID in FIG. 1) and their own attributes (labelled att in FIG. 1). The interacting devices may each have their own special requirements and capabilities with regard to the generation, maintenance and usage of cryptographic keys. For example, some devices may not have the capability to store keys securely when they are powered-off, devices may differ in terms of their capacity to generate random numbers or their capacity to generate a key from scratch, and so on.

The number of identifiers and/or attributes possessed by a given one of the electronic devices is not particularly limited. An identifier may be represented using identifier data. An attribute may be represented using attribute data. Identifiers and attributes may be referred to (without differentiation) using the expression "feature", and the expression "feature data" may designate identifier data, attribute data, or both, depending on the context. Feature data may represent a feature in any other convenient manner, including: direct representation (e.g. an identifier 01101101 may be represented using identical feature data 01101101), representation in a symbolic form, and so on. The devices may store feature data representing their own identifiers and attributes. The devices may store feature data representing a sub-set of their own identifiers and attributes. The feature data of a device may indicate what its capabilities are: for example, the feature data may indicate what the device's capabilities are with regard to the generation, maintenance and usage of cryptographic keys. The feature data of a device may be associated with the legitimacy of the device with regard to accessing memory resources of memory devices.

Devices may have different security policies from one another, where an individual security policy may define a set of conditions that must be met in order for them to take part in an interaction of a particular type with a collaborating device. The devices' respective security policies are labelled SecPol in FIG. 1.

It is to be understood that devices according to this disclosure may possess arbitrary numbers of identifiers, attributes and/or security policies, as desired or required in the application in question.

In the example system of FIG. 1, the electronic devices interact by communicating digital data to one another. In order for security to be preserved in these interactions, the electronic devices prove to one another that they possess specific identifiers and attributes that are relevant to the security policies of the device with which they are collaborating (or proposing to collaborate). The electronic devices may provide this proof by performing cryptographic operations using cryptographic private keys that are digital signatures of feature data corresponding to their specific identifiers and attributes.

Thus, for example, if the device 12 in FIG. 1 seeks to prove to the device 14 that device 12 possesses a particular attribute ATTx, then device 12 performs a cryptographic operation which proves to device 14 that device 12 possesses a private key that is a digital signature of feature data defining attribute ATTx.

It is possible to generate vast numbers of cryptographic keys extremely quickly by using the above-mentioned approach in which the private keys of a public-private key pair are digital signatures and each digital signature signs data defining an identifier or attribute of an electronic device requesting key generation.

An example of a method for providing an electronic device with a cryptographic private key of this type will now be described with reference to FIG. 2. In this example, the key generation and distribution to the electronic device takes place at the device's boot time, but this is not mandatory.

Figure 2:
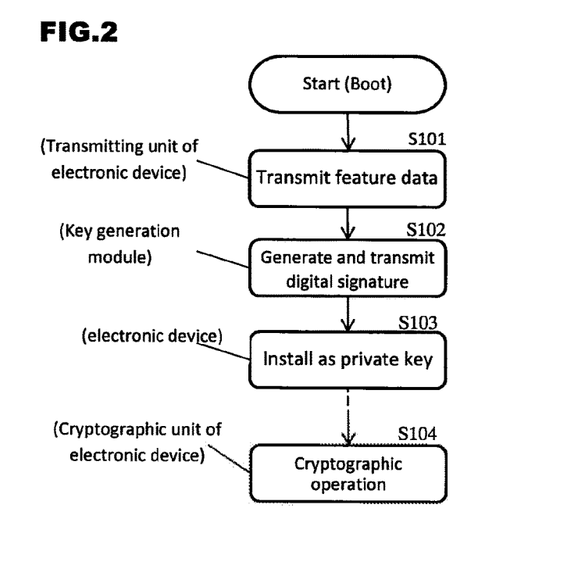
FIG. 2 is a flow chart illustrating a method of providing an electronic device with a cryptographic private key according to the present disclosure.

The method of FIG. 2 begins with a transmitting unit of the electronic device transmitting a request to a key generation module (step S101), where the request comprises feature data relating to a feature of the electronic device. In response to receiving the request, the key generation generates a digital signature of the feature data. In some examples, this digital signature will be supplied to the electronic device that sent the request (the requestor electronic device) to serve as a private cryptographic key of the requestor electronic device. The format and syntax of the feature data/request is not particularly limited. The request may include feature data for plural identifiers and/or attributes. As such, in some examples, in response to the same single request, the key generation module may generate a set of private keys corresponding to the respective individual features, where each individual key may correspond to an individual feature.

Figure 4A:
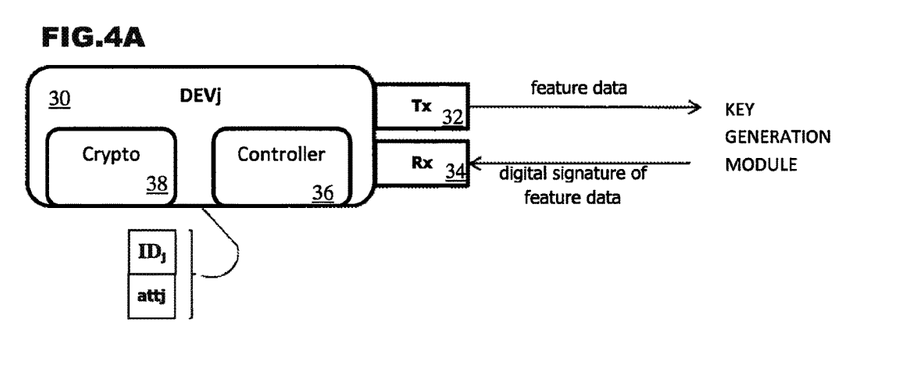
FIG. 4A is a diagram illustrating an example electronic device according to the present disclosure.
Figure 4B:
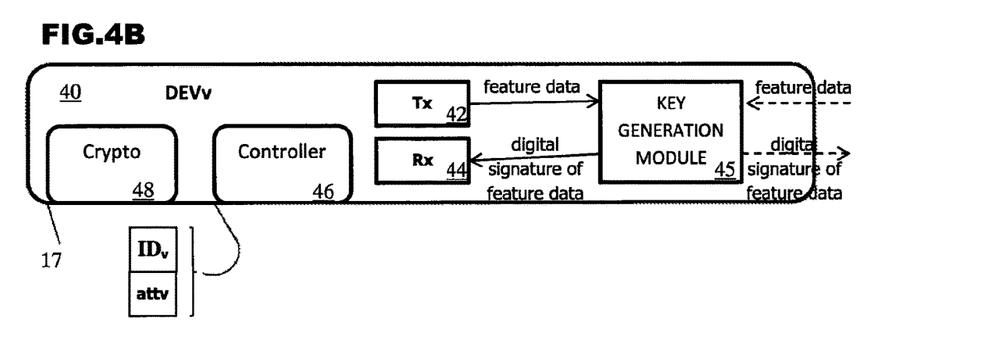
FIG. 4B is a diagram illustrating another example electronic device according to the present disclosure.

The key generation module may be a module external to the electronic device (as in the example of FIG. 4A) or another component of the same (requesting) electronic device (as in the example of FIG. 4B). The key generation module may be a hardware or software component. Communication of digital data between the electronic device transmitting unit and the key generation module may take place by any feasible method.

The key generation module may be the root of trust. Other devices may trust that the key generation module has reliable knowledge of which device possesses which identifiers/attributes and only generates a feature-based private key for a device when that device does possess the feature that is being signed to generate that private key. The key generation module may obtain knowledge regarding the identifiers/attributes of a device in any feasible manner, for example via verification of a certificate issued by a relevant authority (e.g. the device manufacturer).

An example will now be given of a method that the key generation module may use to generate a private cryptographic key for a requesting electronic device, based on the supplied features data.

In this example, the key generation module has its own private key, an associated public key and the ability to apply a digital signature method to generate a digital signature. In this example, the key generation module may use a Schnorr signature method to generate the digital signature of the identity or attribute data supplied by the requestor electronic device key. Other types of signature methods may be used as well.

The public and private keys of the key generation module are generated as follows.

Prime numbers p and q are generated. To enhance security, the lengths of the parameters p and q may be set long so that that searching for the cryptographic private key is computationally infeasible. For example, p may be set 1024 bits or longer and q may be set 160 bits or longer.

An element g is generated where g is an element $g \in \mathbb{Z}_p^*$ that generates the subgroup Gq (for integer p, $\mathbb{Z}_n$ denotes the residue class ring modulo p, and $\mathbb{Z}_p^*$ denotes the multiplicative group of invertible elements in $\mathbb{Z}_p$).

x is a random number chosen uniformly at random in the set $\{1, 2, \ldots, q-1\}$ y is computed according to $y=g^x$ Then: the private key of the key generation module is K=(p,q,g,x), and the public key of the key generation module is $\hat{K}$=(p,q, g,y).

Let IA represent the identifier data or attribute data provided by the device entity requesting a key from the key generation module.

The key generation module selects a random number r uniformly at random from $\{1, 2, \ldots, q-1\}$ then generates a message digest function (hash) of (r‖IA) where the symbol ‖ denotes the concatenation of two (binary) strings (or of binary representations of integers and group elements), and the symbol c represents this hash.

The key generation module uses parameter y of its public key and the hash c to compute $y^c$ and then calculates a parameter s that allows the following equation to be satisfied: $g^s y^c = g^r$.

The key generation module sets (s,t) as the private key of the requestor electronic device. Thus the cryptographic private key that is generated for the requestor electronic device may be tightly associated with the attribute or identifier of the requestor electronic device. In the case where IA designates an identifier of the electronic device, this cryptographic private key could be referred to as an identifier-based (or identity-based) key. The identity-based key generated by the above-described method differs from known identity-based keys because it is a private key that is itself a digital signature. In a similar way, in the case where IA designates an attribute of the electronic device, this cryptographic private key could be referred to as an attribute-based private key. In situations in which it is not necessary to differentiate between cases where IA represents an identifier and cases where IA represents an attribute, the expression "feature-based key" may be used.

The public key corresponding to the feature-based private key generated by the key generation module is $(g^s,t)$. The key generation module may be arranged to compute the public key $(g^s,t)$ as well as the private key (s,t) but this is not mandatory.

Returning to FIG. 2, after generating the private key or the electronic device, the key generation module may transmit back to a receiving unit of the requestor electronic device either just the generated private key (e.g., digital signature of attribute/identifier) or the generated private key as well as its associated public key (step S102). in some examples, the electronic device may itself generate the public key that corresponds to the received feature-based private key, for example in a case where the key generation module is external to the electronic device and transmits to the electronic device only a feature-based private key, without its corresponding public key.

Although not illustrated in FIG. 2, the key generation module may inform a key manager module of the identifier/attribute-related keys that it generates for different electronic devices.

In the example described above, the key generation module applied a Schnorr digital signature method to generate the identity/attribute-based keys. The selection of a Schnorr digital signature method as the method for use in producing the digital signatures provides specific technical advantages, including the fact that Schnorr digital signatures may be aggregated (as shall be described below), which enables a more complex aggregated key to be formed by aggregating simpler keys. Use of plural aggregated Schnorr signatures to form a single key provides a particularly efficient technique for verifying, in a single process, the fact that a given electronic device possesses plural identifiers and/or attributes. This advantage of efficiency may be obtained even when using other digital signature methods different from the Schnorr method but that have the same type of aggregative property, although efficiency may vary between the different methods. Pairing-based signature methods (for example the Boneh Lynn Shacham short signature method described in "Aggregate and Verifiably Encrypted Signature from Bilinear Maps", Lecture Notes in Computer Science 2248, pp 514-532, Springer-Verlag, 2003 and in "Short Signatures from Weil pairings" in Proceedings of Asiacrypt 2001) may be mentioned as an example of another type of signature method that provides aggregative properties.

Another signature method that may be used in place of a Schnorr digital signature method is an RSA (Rivest Shamir Adleman) signature method.

Figure 5:
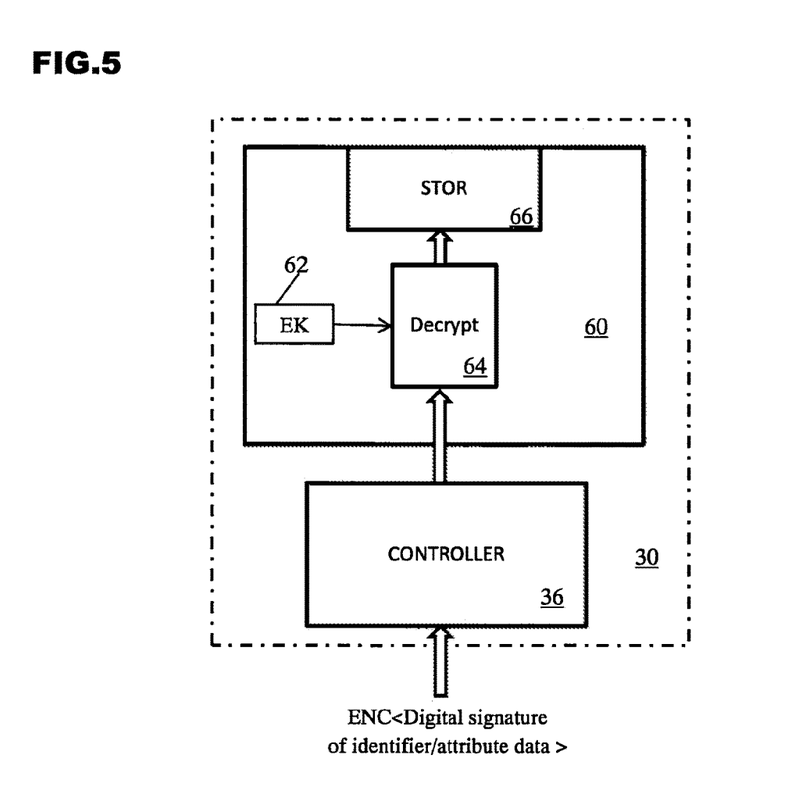
FIG. 5 is a diagram illustrating a portion of an electronic device according to the present disclosure that implements a key installation process.

Returning to FIG. 2, responsive to the receiving unit of the electronic device receiving the digital signature of the identifier/attribute whose feature data the transmitting unit of the electronic device had sent to the key generation module, the electronic device may install the received digital signature as a cryptographic private key (step S103 in FIG. 2). The installation process may be as simple as marking the installed digital signature as an active key, or may be more complex. As indicated above, the installation process may include the electronic device generating the public key that corresponds to the received digital signature/private key. It may be desirable for the installation of the digital signature as a private key to include storing the digital signature in secure storage. One arrangement for performing this function is illustrated in FIG. 5. FIG. 5 only illustrates certain portions of an example electronic device according to the present disclosure, i.e. portions involved in key installation.

According to the example illustrated in FIG. 5, an electronic device 30 includes a field programmable gate array (FPGA) 60 which has an embedded cryptographic key EK (labelled 62 in FIG. 5) which is distinct from the feature-data-based public and private keys discussed above. The cryptographic key embedded in the field programmable gate array may be, for example, an AES key (Advanced Encryption Standard key). The FPGA also has a secure storage location 66 and a decryption unit 64 that applies decryption using the key EK embedded in the FPGA to data received via a particular gate of the FPGA. The controller 36 of the electronic device 30 receives the identifier/attribute-based digital signature from the key management module in a pre-encrypted form, that is, already encrypted according to the embedded key EK present in the FPGA 60. The controller 36 installs the received digital signature in the electronic device 30 as a private key of the electronic device associated with a particular identifier/attribute by supplying the encrypted digital signature to the relevant gate of the FPGA. The decryption unit 64 decrypts the received digital signature and stores it in the secure storage 66.

In view of providing adequate security, it may be appropriate for the key embedded in the FPGA to be a strong secret. Current recommendations regarding strong secrets suggest that if an AES key is used as the embedded key then it should be at least 128 bits long. The embedded key may be created in a secure environment and embedded in secure conditions. This may take place, for example, during manufacturing, at set-up time if this takes place in a secure environment, and so on. In some examples, the embedded key may be a key of a kind other than an AES key.

It is not mandatory for the identity/attribute-based private key to be written to the electronic device during boot time of the electronic device. However, if writing of the key is to take place during boot time then the above-described technique (based on writing to an FPGA having an embedded key, a decryption unit and secure storage) is sufficiently fast that it may take place without requiring the boot time to be prolonged just for writing of the key.

In an example in which the identifier/attribute-based digital signature has been installed in the electronic device, it is available for use in cryptographic operations. The electronic device may use the installed identifier/attribute-based digital signature as a private key in a cryptographic operation to prove that the electronic device possesses the identifier/attribute which was signed in generation of this digital signature (step S104 in FIG. 2).

As already indicated, because the cryptographic private keys generated for an electronic device as described above are tightly bound to particular identifiers and attributes possessed by that electronic device, the keys provide an efficient tool to enable the electronic device to prove to other electronic devices that it possesses the relevant identifier(s)/attribute(s). This use of the keys will be described below with reference to FIG. 3.

Figure 3:
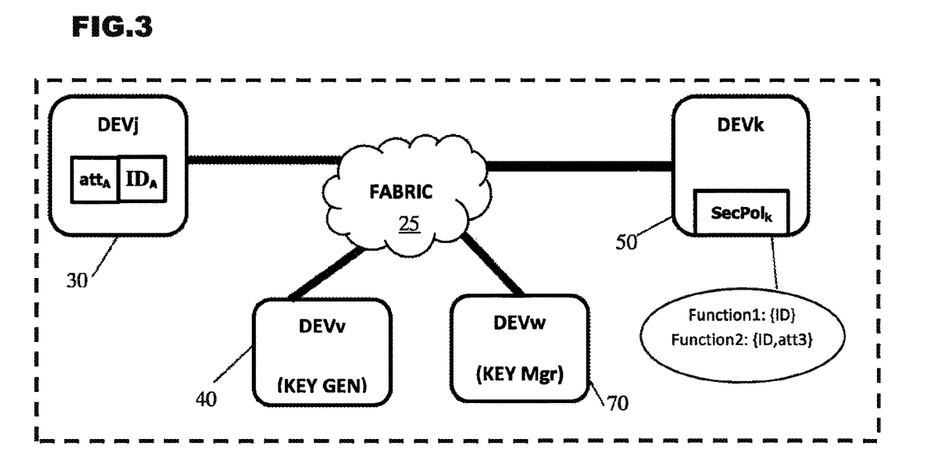
FIG. 3 is a diagram representing an example of a system according to the present disclosure comprising devices having different roles and that interact by communicating digital data to one another.

FIG. 3 illustrates four electronic devices 30, 40, 50, 70 that are interconnected by connection fabric 25 and interact with one another. In this example, the device 70 has a dedicated key management function but the other three devices have wider functionality. The device 40 has a key generation function as well as the wider functionality.

The key manager device 70 maintains details of the relationship between the identifiers/attributes of those devices in the system for which it is responsible and the corresponding identity/attribute-based keys (that is, the associated public keys) issued for those devices. Details of these relationships may be maintained by any feasible techniques, for example, using look-up tables. The assignment of which keys are managed by the key manager device 70 may be set in any feasible way, for example: the key manager device 70 may be arranged to manage keys that are generated by a particular set of key generation modules, keys generated for a predetermined group of devices, keys generated for any devices that have undergone a registration process with the key manager device 70, and so on. The key manager device 70 need not be dedicated solely to key management.

FIG. 4A illustrates an example of an electronic device 30 according to the present disclosure, which is arranged to obtain cryptographic keys from an external key generation module. The device 30 has features identified by a set of identifiers IDj and a set of attributes attj. Device 30 has a transmitting unit for transmitting feature data to the external key generation module, a receiving unit 34 for receiving feature-based digital signatures (private keys) from the key generation module, a controller 36 for handling installation of the received feature-based digital signatures as private keys, and a cryptographic unit 38 for performing cryptographic operations in which the perceived feature-based digital signatures function as private keys of the device 30. The controller 36 may maintain association data indicating which identifier or attribute is associated with each of the feature-based private keys that have been received from the key generation module. The association data may be maintained in any feasible form, for example it may be stored in the form of a look-up table.

FIG. 4B illustrates an example of an electronic device 40 according to the present disclosure, which integrates a key generation module into a device of the general type illustrated in FIG. 4A. Thus, in addition to a transmitting unit 42, a receiving unit 44, a controller 46 and a cryptographic unit 48, this device 40 includes a key generation module 45. Also, in the illustrated example, the key generation module 45 is not just for use by the device 40 but also may be accessed by external devices so as to generate keys for them. The device 40 has features identified by a set of identifiers IDv and a set of attributes atty.

According to the example illustrated in FIG. 3, the electronic device 50 may perform two functions that involve interactions with other devices in the system and these functions have associated security policies. The example security policy associated with Function 1 means that device 50 performs Function 1 in an interaction with a collaborating electronic device conditional upon the collaborating device having a suitable identifier (e.g. an identifier indicating that it was manufactured by a selected manufacturer). The security policy associated with Function 2 means that device 50 performs Function 2 in an interaction with a collaborating electronic device conditional upon two conditions being met: firstly, the collaborating device must have a suitable identifier (here the same identifier as in the security policy for Function 1) and, secondly, the collaborating device must have a particular attribute (e.g. the attribute of having the ability to store data securely). An example of Function 2 may be the function of storing data in an external device (e.g. device 30).

Figure 6:
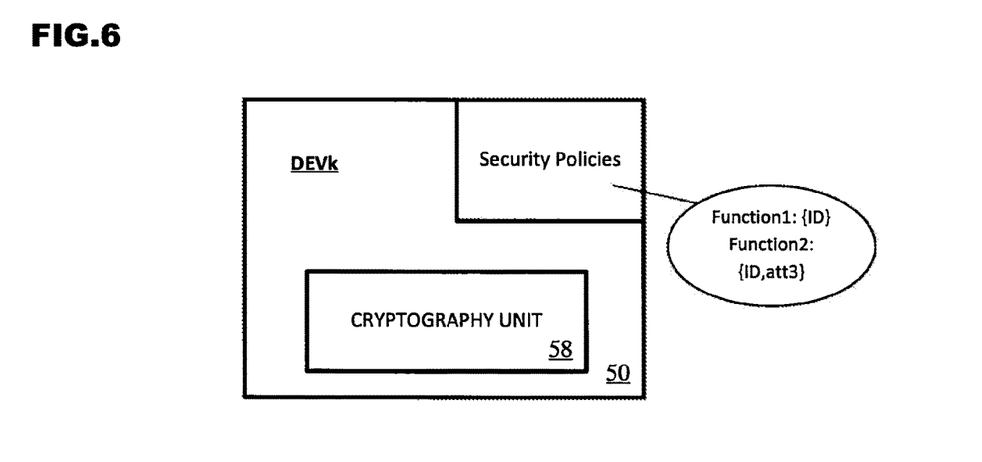
FIG. 6 is a diagram illustrating a portion of an electronic device according to the present disclosure that implements security policies.

FIG. 6 illustrates an example of electronic device 50 and shows only a cryptography unit 58 of the device and an indication of the security policies applied by device 50.

In an example key management method according to the present disclosure, device 50 may verify, based on the identity/attribute-based private keys possessed by device 30, whether or not device 30 has a set of features (in terms of identifiers and attributes) that satisfy the requirements of its (device 50's) security policies. Thus, for instance, if device 50 has data that it wishes to store externally, such that it wishes to perform Function 2, and device 30 is a candidate to be the collaborating device which performs the storage, then device 50 may perform a cryptographic operation to check that device 30 possesses private keys that are associated with the appropriate identifier and attribute values specified in the security policy for function 2.

Two examples of verification processes according to the present disclosure will now be described in the context of two cases.

Case 1:

This is an example case where device 50 wishes to interact with device 30 to perform Function 1 and so needs to verify that device 30 possesses a first private key ($PRK1_j$)

that is associated with the appropriate identifier value to satisfy the condition in the security policy for Function 1.

According to both of the example verification processes device 50 accesses the key manager device 70 to check the public keys that are available for device 30 and learns that device 30 has a public key (PUBK1$_I$) that is asserted to have an association with the desired identifier. Device 50 acquires the public key (PUBK1$_I$) and then proceeds with a cryptographic process to verify that device 30 possesses a private key associated with public key (PUBK1$_I$), as a proof that device 30 possesses the relevant identifier.

The first example verification process uses the cryptographic operations of encryption/decryption. The device 50 generates a ciphertext by encrypting a random nonce using (PUBK1$_I$), that is, using device 30's public key which is associated with the appropriate identifier. The device 50 may transmit the ciphertext to device 30 in a request message. Device 30 uses its private key corresponding to the public key (PUBK1$_1$) to decrypt the ciphertext and send the nonce back to device 50. As long as the returned nonce matches the random nonce encrypted by device 50, device 50 has verified that device 30 possesses a private key that is associated with the desired identifier.

The second example verification process uses the cryptographic operations of applying a digital signature and authenticating a digital signature. In this case, the device 50 sends to the device 30 a request message including a random nonce in clear text. Device 30 creates a digital signature on the nonce and, in the process of applying a digital signature algorithm, uses (PRK1$_I$) as its private key. Device 30 sends the digitally-signed random nonce to the device 50 which uses device 30's public key to perform signature verification. If the signature verification succeeds then device 50 is satisfied that device 30 has proved possession of a private key associated with the desired identifier.

Case 1 described above relates to implementation of a security policy that involves a single condition holding on a single identifier or attribute. However, in a practical system where arbitrary security policies may be encountered, it is likely that a single security policy may involve conditions requiring appropriate values for one, two, or more than two features (identifiers and/or attributes). The description that follows relates to an example of verifications performed in a case where a security policy requires proof that a potential collaborating device possesses more than one feature (in terms of identifiers and/or attributes).

Case 2:

This is an example case where device 50 wishes to verify that device 30 possesses a first private key (PRK1$_I$) that is associated with the appropriate identifier value to satisfy the first condition in the security policy for Function 2, as well as a second private key (PRK2$_I$) that is associated with the appropriate attribute value to satisfy the second condition in the security policy for Function 2.

Once again device 50 accesses the key manager device 70 to check the public keys that are available for device 30. In this case, device 50 learns that device 30 has a public key (PUBK1$_I$) that is asserted to have an association with the desired identifier to satisfy the first condition in the security policy for Function 2, as well as a second public key (PUBK2$_I$) that is asserted to have an association with the appropriate attribute value to satisfy the second condition in the security policy for Function 2.

Device 50 acquires the public keys (PUBK1$_I$) and (PUBK2$_A$) and then proceeds with a cryptographic process to verify that device 30 possesses a private key associated with public key (PUBK1$_I$), as a proof that device 30 possesses the relevant identifier, and a private key associated with public key (PUBK2$_A$), as a proof that device 30 possesses the relevant attribute.

Once again, the first example verification process uses the cryptographic operations of encryption/decryption. However, according to the present example, in this Case 2—where it is desired to prove that device 30 possesses a particular combination of features—a compound key is used in the encryption/decryption process. The compound key is formed by aggregating the two public keys (PUBK1$_I$) and (PUBK2$_A$) relating to the two features concerned by the security policy for Function 2. The aggregated public keys may be aggregated using any feasible method. In some examples, the encryption process using the public keys may be homomorphic.

The device 50 generates a ciphertext by encrypting a random nonce using the compound public key and transmits the ciphertext to device 30 in a request message. Device 30 uses its corresponding compound private key to decrypt the ciphertext and send the decrypted random nonce back to device 50. Once again, if the returned nonce matches the random nonce that was encrypted, then device 30 has—in a single verification process—proved possession of both of the two private keys associated with the desired identifier and desired attribute.

The second example verification process may also use the cryptographic operations of applying a digital signature and authenticating a digital signature. However in the present example, in this Case 2, a compound public key and compound private key may be used. Thus, the device 50 sends to the device 30 a request message including a random nonce in clear text. Device 30 creates a digital signature on the nonce and, in the process of applying a digital signature algorithm, uses the compound private key as its private key. Device 30 sends the digitally-signed data to the device 50 which uses a compound key based on the appropriate ones of device 30's public keys to perform signature verification. If the signature verification succeeds then device 30 has—in a single verification process—proved possession of both of the two private keys associated with the desired identifier and desired attribute.

In order to apply the above-described verification processes using compound keys, the private keys generated based on identifier/attribute values may need to be generated using aggregative digital signature methods. The Schnorr digital signature method is an example of a suitable aggregative method, as will be seen from the explanation below, but other feasible algorithms may also be used.

Consider the case of a single key generation module which generates two private keys (t1,s1) and (t2,s2) for an electronic device by generating Schnorr signatures for two features (identifiers and/or attributes) IA1 and IA2 possessed by the electronic device. These two private keys may be aggregated together, satisfying $g^{(s1+s2)}y^{(c1+c2)}=t1\ t2$. Then s1+s2 is used as the compound private key and (t1,$g^{(s1)}$,t2, $g^{(s2)}$) serves as the compound public key. These compound keys may be used successfully to perform the verification processes based on encryption/decryption or digital signature generation and verification.

Now consider the case where two different key generation modules have generated the two private keys (t1,s1) and (t2,s2) for an electronic device by generating Schnorr signatures for two features (identifiers and/or attributes) IA1 and IA2 possessed by the electronic device. In this case, there may be two different values for the parameters x and y, relating to the cryptographic keys of the key generation modules. In this example, the values relating to the first key generation module may be referred to as x1,y1, while the values relating to the second key generation module may be referred to as x2,y2. The private key generated by the first key generation module may be referred to as (t1, s1) and the private key generated by the second key generation module may be referred to as (t2,s2)

In this case, the two private keys may be aggregated together, here satisfying $g^{(s1+s2)}y1^{(c1)}y2^{(c2)}=t1\ t2$. Accordingly, s1+s2 may be used as the compound private key and $(t1,g^{(s1)},t2,g^{(s2)})$ may serve as the compound public key.

The present disclosure is not particularly limited having regard to the syntax and semantic content of security policies or requests that pass between the interacting devices. In some examples, all the devices involved in the communications may have pre-agreed with the security policies and their representations. In some examples, there may be a representation for the security policies and requests that may be known to all interacting devices. In some examples, only the syntax and semantic content of security policies or requests may be agreed to between interacting systems. Other types of agreements regarding security policies and requests may be understood between interacting devices as well.

A system comprising computation devices and memory devices that are interconnected to form a computing platform (as in the example of FIG. 1) may include devices whose security policies specify conditions regarding the legitimacy of electronic devices with regard to accessing memory resources of memory devices.

In principle it could be contemplated to generate cryptographic keys for all the identifiers/attributes of an electronic device as soon as that device boots up. However, such an approach would involve a considerable investment in time and computing power with no guarantee that all of the generated keys were actually necessary. Furthermore, in the case of a system that includes large numbers of interacting devices, the time required to generate all of the applicable keys could cause unacceptable delays in system operation.

In a key management method according to an example of the present disclosure, the key generation may be performed in a developmental or evolutionary manner. First, there may be a lightweight key generation and distribution phase, in which a single private key based on an identifier/attribute of the electronic device is generated and distributed to the electronic device. Additional identifier/attribute-based keys may be generated gradually over the period of use of the electronic device. For instance, the electronic device may generate feature-based private keys as and when the electronic device needs them in view of processing requests received from other electronic devices. According to this method the trusted relationship between electronic devices in a system may be gradually built up in a highly efficient manner until the whole system eventually reaches a trusted attestation.

In order to enhance security, the first stage of this evolutionary-type method may take place in a secure environment (e.g. during manufacture, during an initial setup phase when the device is first booted, in a trusted execution environment, and so on). One convenient approach for implementing the first phase is to generate a single identifier-based key when each electronic device in a system boots up. If appropriate, in the first stage or a small number of identifier/attribute-based keys may be generated instead of just a single key.

As indicated above, in the second stage of this evolutionary-type method the electronic device may generate feature-based private keys at times when it determines that it wishes to or needs to demonstrate to a third party that it possesses a particular identifier or attribute but it does not yet have a private ley based on the relevant identifier/attribute. For this purpose, the electronic device may comprise a key-detection module (not shown) that can process requests received from third parties and identify which identifiers/attributes the third party wishes the electronic device to possess to enable interaction with that third party device. The key-detection module can determine whether or not a targeted identifier/attribute is relevant to the electronic device (i.e. does it possess this identifier/attribute). To determine whether or not the electronic device already has a feature-based private key appropriate to prove possession of a relevant one of the targeted identifier/attributes, the key-detection module may access association data maintained by a controller of the electronic device and which indicates which private key is associated with which identifier/attribute of the electronic device.

Although the present disclosure has been presented in terms of certain specific examples it is to be understood that various modifications and extensions may be made in the examples without departing from the scope of the appended claims.

For instance, although an example discussed above made use of a key manager to enable a device to obtain the public key of another device with which it intended to collaborate, the devices may be arranged to communicate their own public keys. As another example, in the description above regarding verification processes in which an electronic device proves to a third party device that it possess a particular feature-based private key, the third party device obtains the public key associated with the relevant private key from a key manager device. However, the electronic device can itself provide the relevant public key to the third party device and this may reduce the communication load on the third party device (because it no longer needs to engage in communication with the key manager).

The description above relates to examples of the key management functions of key generation and use of keys for verification. In the above examples a feature-based private key is generated in the form of a digital signature of data relating to a single feature of the requestor device, and this private key is used to verify that the requestor device possesses that single feature. To prove that the requestor device possesses plural features a verification process is performed in which plural of these feature-based private keys are aggregated. However, it may be possible to perform the key generation function by generating a digital signature of a string that comprises more than one feature, that is, in the key generation process described above, IA may be a string formed from more than one feature. In such a case it may be possible to demonstrate that a device possesses a combination of features via use of a cryptographic private key which is a digital signature of a string comprising the combination of features.

The foregoing disclosure describes a number of examples embodiments for management of cryptographic keys. The disclosed examples may include systems, devices, computer-readable storage media, and methods for management of cryptographic keys. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method implemented in a computing device comprising a physical processor, the method comprising:
    transmitting, by the computing device, feature data of the computing device to a key generation module, wherein the feature data indicates a first capability of the computing device;
    receiving, by the computing device, from the key generation module, a first digital signature associated with a first feature indicating the first capability of the computing device and a second digital signature associated with a second feature of the computing device, wherein the digital signatures are generated using the feature data that is transmitted by the computing device;
    aggregating the first digital signature and the second digital signature into a compound cryptographic key for communication;
    receiving, by the computing device, a request from a second computing device to perform a requested function, wherein the first capability and second feature are required to perform the requested function; and
    in response to the request from the second computing device, performing, by the computing device, a cryptographic operation using the cryptographic key, the cryptographic operation to indicate, to the second computing device, the first capability of the computing device and the second feature of the computing device to perform the requested function.

2. The method according to claim 1, the method further comprising:
    generating, by the key generation module, the first digital signature and the second digital signature using the feature data from the computing device.

3. The method according to claim 1, wherein the transmitting the feature data, the receiving the digital signature, and the installing the digital signature as the cryptographic private key are performed during a boot process of the computing device.

4. The method according to claim 1, wherein the request includes a random nonce in clear text.

5. The method according to claim 1, further comprising installing, by the computing device, the first digital signature and the second digital signature received from the key generation module as a cryptographic private key for communication.

6. The method according to claim 1, further comprising installing, by the computing device, the compound cryptographic key for communication.

7. The method according to claim 1, wherein the second feature includes an identifier of the computing device or an attribute of the computing device indicating a second capability of the computing device.

8. The method according to claim 1, wherein the first capability of the computing device includes a key generation capability, a key management capability, a key usage capability, or any combination thereof.

9. An electronic device for management of cryptographic keys, the device having a set of features, each individual feature of the set of features being one of an identifier or an attribute of the device, the device comprising:
    a transmitting unit that transmits feature data to a key generation module, wherein the feature data indicates a first capability of the device;
    a receiving unit that receives from the key generation module, a digital signature associated with the first capability of the computing device, wherein the digital signature is generated using the feature data that is transmitted, the receiving unit further receives a request from a second computing device to perform a requested function, wherein the first capability is required to perform the requested function;
    a controller that, during a boot process of the computing device, controls the transmitting unit to transmit the feature data, controls the receiving unit to receive the digital signature, and installs the digital signature that is received in the device as a cryptographic private key; and
    a cryptographic unit that, in response to the request from the second computing device, performs a cryptographic operation using the cryptographic private key, the cryptographic operation indicates, to the second computing device, the first capability of the computing device to perform the requested function.

10. The electronic device according to claim 9, further comprising:
    a field programmable gate array, wherein the field programmable gate array has an embedded cryptographic key, a decryption unit and a secure storage, wherein:
        the receiving unit is operative to receive an encrypted version of the digital signature, wherein the encrypted version of the digital signature is encrypted using the embedded cryptographic key;
        the controller is operative to input the encrypted version of the digital signature to the field programmable gate array; and
        the field programmable gate array is operative to decrypt the encrypted version of the digital signature by a decryption unit using the embedded cryptographic key and to store the digital signature in the secure storage.

11. The electronic device according to claim 9, wherein:
    during installation of the digital signature that is received in the device as the cryptographic private key, the controller creates a cryptographic public key corresponding to the cryptographic private key.

12. The electronic device according to claim 9, wherein:
    the transmitting unit is operative to transmit to the key generation module plural feature data corresponding to respective plural individual features of the device,
    the receiving unit is operative to receive, from the key generation module, plural digital signatures, one for each of the plural feature data that is transmitted, and
    the controller is operative to install the plural digital signatures that are received in the device as plural cryptographic private keys for use by the cryptographic unit in cryptographic operations.

13. The electronic device according to claim 12, wherein:
the controller is to maintain association data indicating a link between each of the cryptographic plural private keys and the feature data that is transmitted;
the controller comprises a key detection module that recognizes a target identifier or a target attribute and determines whether the controller maintains the association data indicating the link between the target identifier or the target attribute and one of the plural cryptographic private keys installed in the device; and
responsive to the key detection module determining that the controller maintains the association data indicating the link between the target identifier or the target attribute and the one of the plural cryptographic private keys installed in the device, the key detection module controls the cryptographic unit to:
perform a cryptographic operation in which an individual private key linked to the target identifier or the target attribute functions as the cryptographic private key, and
output a result of the cryptographic operation from the device.

14. The electronic device according to claim 12, wherein:
the controller is to maintain association data indicating a link between each individual cryptographic private key of the plural cryptographic private keys and a corresponding identifier or a corresponding attribute of the feature data that is transmitted;
the controller comprises a key detection module that recognizes a target identifier or a target attribute, determines whether the target identifier or the target attribute is relevant to the electronic device, and determines whether the controller maintains the association data indicating the link between the target identifier or the target attribute and one of the plural cryptographic private keys installed in the device; and
responsive to the key detection module determining that the controller does not maintain the association data indicating the link between the target identifier or the target attribute and the one of the plural cryptographic private keys installed in the device, the controller:
controls the transmitting unit to transmit the feature data corresponding to the targeted identifier or the target attribute to the key generation module,
controls the receiving unit to receive, from the key generation module, the digital signature of the feature data corresponding to the target identifier or the target attribute that is transmitted;
installs the digital signature that is received in the device as an individual private key of the plural cryptographic private keys;
controls the cryptographic unit to perform a cryptographic operation in which the individual private key linked to the target identifier or the target attribute functions as the cryptographic private key of the device; and
outputs a result of the cryptographic operation from the device.

15. The electronic device according to claim 14, wherein the feature data comprises information related to a first attribute and information related to a second attribute;

the receiving unit receives, from the key generation module, the digital signature for a portion of the feature data relating to the first attribute and a second digital signature for a second portion of the feature data relating to the second attribute; and
the controller:
applies a digital signature method to the digital signature and the second digital signature that produces an aggregative digital signature, the aggregative digital signature comprising information related to the digital signature and the second digital signature; and
installs the aggregative digital signature in the device as the cryptographic private key.

16. The method according to claim 9, wherein the cryptographic private key is installed during an initial setup phase when the computing device is first booted and a second cryptographic private key is installed in response to a subsequent request at a later time.

17. The electronic device according to claim 9, wherein the electronic device is interconnected by a connection fabric to a plurality of different electronic devices, wherein the capability of the electronic device is different than respective capabilities of the plurality of different electronic devices.

18. The electronic device according to claim 9, wherein the first capability of the device includes a key generation capability, a key management capability, a key usage capability, or any combination thereof.

19. An electronic device for management of cryptographic keys comprising:
a physical processor that:
sends a request to an external collaborator device to perform a requested interaction, wherein the requested interaction requires a first capability of the external collaborator device, the first capability including a key generation capability, a key management capability, a key usage capability, or any combination thereof;
receives, from the external collaborator device, a response to the request; and
verifies whether the external collaborator device comprises the first capability by performing a cryptographic operation using the response from the external collaborator device and a private key of a public-private cryptographic key pair, wherein the private key of the public-private cryptographic key pair is a digital signature associated with the first capability.

20. The electronic device according to claim 19, wherein:
the physical processor performs the requested interaction with the external collaborator device conditional on verifying that the external collaborator device comprises the first capability, and performs the verifying using a cryptographic public key that aggregates plural public keys of the external collaborator device, and
the plural public keys of the external collaborator device have associated private keys that are digital signatures of feature data of the external collaborator device.

* * * * *